US008578352B1

(12) United States Patent  
Mitrovic et al.

(10) Patent No.: US 8,578,352 B1
(45) Date of Patent: Nov. 5, 2013

(54) OPTIMIZING OBJECT ORIENTED PROGRAMS USING LIMITED CUSTOMIZATION

(75) Inventors: Srdjan Mitrovic, Atherton, CA (US); Lars Bak, Tranbjerg J. (DK)

(73) Assignee: Google, Inc., Mountain View, CA (US)

( * ) Notice: Subject to any disclaimer, the term of this patent is extended or adjusted under 35 U.S.C. 154(b) by 273 days.

(21) Appl. No.: 13/077,566

(22) Filed: Mar. 31, 2011

(51) Int. Cl.
*G06F 9/45* (2006.01)

(52) U.S. Cl.
USPC ........... 717/140; 717/141; 717/147; 717/148; 717/151; 717/153; 717/154

(58) Field of Classification Search
None
See application file for complete search history.

(56) References Cited

U.S. PATENT DOCUMENTS

| | | | | |
|---|---|---|---|---|
| 5,754,862 A * | 5/1998 | Jones et al. | | 717/170 |
| 5,794,041 A * | 8/1998 | Law et al. | | 717/104 |
| 6,507,946 B2 * | 1/2003 | Alexander et al. | | 717/145 |
| 6,643,711 B2 * | 11/2003 | Bracha et al. | | 719/315 |
| 6,658,657 B1 * | 12/2003 | Lueh | | 717/158 |
| 6,865,730 B1 * | 3/2005 | Burke et al. | | 717/116 |
| 7,526,760 B1 * | 4/2009 | Daynes et al. | | 717/153 |
| 7,665,075 B1 * | 2/2010 | Daynes et al. | | 717/148 |
| 7,895,603 B1 * | 2/2011 | Lam et al. | | 719/316 |
| 7,992,130 B2 * | 8/2011 | Bozza et al. | | 717/116 |
| 2002/0016864 A1 * | 2/2002 | Brett | | 709/315 |
| 2002/0144243 A1 * | 10/2002 | Alexander, III et al. | | 717/140 |
| 2003/0051234 A1 * | 3/2003 | Schmidt | | 717/158 |
| 2004/0015912 A1 * | 1/2004 | Bottomley | | 717/148 |
| 2004/0187094 A1 * | 9/2004 | Gil et al. | | 717/116 |
| 2005/0138611 A1 * | 6/2005 | Inglis et al. | | 717/151 |
| 2005/0155023 A1 * | 7/2005 | Li et al. | | 717/140 |
| 2006/0059195 A1 * | 3/2006 | Hall et al. | | 707/103 Y |
| 2007/0038988 A1 * | 2/2007 | Das | | 717/157 |
| 2007/0245324 A1 * | 10/2007 | Inglis et al. | | 717/140 |
| 2009/0064116 A1 * | 3/2009 | Wong | | 717/153 |
| 2009/0138847 A1 * | 5/2009 | Beckwith et al. | | 717/108 |
| 2012/0117549 A1 * | 5/2012 | Doyle et al. | | 717/147 |

OTHER PUBLICATIONS

Holst et al., "Incremental Table-Based Method Dispatch for Reflective Object-Oriented Languages," 1997.*
Debbabi et al., "Method Call Acceleration in Embedded Java Virtual Machines," Springer-Verlag Berlin Heidelberg 2003.*
Arnold et al., "A Survey of Adaptive Optimization in Virtual Machines," Proceedings of the IEEE, vol. 93, No. 2, Feb. 2005.*
Aigner et al., "Eliminating Virtual Function Calls in C++ Programs," ECOOP '96 Conference Proceedings, Springer Verlag LNCS 1098, 1996.*
Brewer, "Applicability of Method Specialization Techniques to Java," 2010.*
Dean et al., "Selective Specialization for Object-Oriented Languages," ACM, 1995.*

(Continued)

Primary Examiner — Insun Kang
(74) Attorney, Agent, or Firm — Sterne, Kessler, Goldstein & Fox PLLC

(57) ABSTRACT

A capability for limited customization that utilizes existing virtual dispatch table technology and allows selective customization is provided. Such a capability combines the usage of virtual dispatch tables with both customized and non-customized code to reduce, or even eliminate over-customization. Further, such a capability may employ a runtime system that decides what methods to customize based on several factors including, but not limited to the size of a class hierarchy, the amount of available space for compiled code, and the amount of available time for compilation.

21 Claims, 6 Drawing Sheets

(56) References Cited

OTHER PUBLICATIONS

Ishizaki et al., "A Study of Devirtualization Techniques for a Java™ Just-In-Time Compiler," ACM 2000.*

Alpern et al., "Efficient Implementation of Java Interfaces: Invokeinterface Considered Harmless," IBM T.J. Watson Research Center 2001.*

Bacon, "Fast and Effective Optimization of Statically Typed Object-Oriented Languages," 1997.*

Driesen et al., "The Direct Cost of Virtual Function Calls in C++," OOPSLA 1996.*

Detlefs et al., "Inlining of Virtual Methods," Springer-Verlag Berlin Heidelberg 1999.*

Chambers, C., et al., "Customization: Optimizing Compiler Technology for SELF, a Dynamically-Typed Object-Oriented Programming Language," Stanford University, ACM 0-89791-306-X/89/0006/0146, pp. 146-160 (1989).

* cited by examiner

OPTIMIZING OBJECT ORIENTED PROGRAMS USING LIMITED CUSTOMIZATION

BACKGROUND

1. Field

Embodiments relate generally to the field of object-oriented computer programs and devices.

2. Background

Object-oriented computer programs generally contain a significant number of virtual calls. Virtual calls may incur a significant performance penalty since they prevent the inlining of methods. For example, the receiver type of a virtual function or method call may not be known. Consequently, the call target of such a virtual function is not known either. Thus, compilers for object-oriented programming languages perform customization, in which several versions of the compiled code are created. Each version of the created code is customized to a specific receiver type. Compilation to a specific receiver type allows inlining of methods that are otherwise not inlineable.

However, object oriented programs contain complex type hierarchies. The number of possible receiver types and therefore the number of customized methods can be quite large. Thus, techniques for optimizing compiler technology in order to reduce the number of customized methods have been developed. An example of one such technique is the work by Craig Chambers and David Ungar, disclosed in their research paper entitled "Customization: Optimizing Compiler Technology for SELF, a Dynamically-Typed Object-Oriented Programming Language," published in the Proceedings of the Association for Computing Machinery (ACM) Special Interest Group on Programming Languages (SIGPLAN) 1989 Conference on Programming language design and implementation, Volume 24, Issue 7, July 1989.

However, the general type of customization discussed in the above-noted research paper requires runtime checks and complex Virtual Machine (VM) support particularly for dynamically typed object oriented programs. A significant problem associated with the implementation of customization using SELF includes over-customization, as a customized version must be created for each different receiver type. Such over-customization causes memory bloat and increases compilation time of object-oriented programs due to unnecessary compilation.

BRIEF SUMMARY

Embodiments relate to optimizing object-oriented programs using limited customization. In one embodiment, it is determined whether a virtual function is compiled for a first receiver class associated with the virtual function. A customized version of the virtual function is generated based on the determination. The generation of the customized version of the virtual function includes compiling the virtual function for the first receiver class. Once customized, an entry for the customized version of the virtual function is stored in a virtual table associated with the first receiver class. The customized version of the virtual function can then be executed for an object of the first receiver class based on the stored entry in the virtual table associated with the first receiver class.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 1:
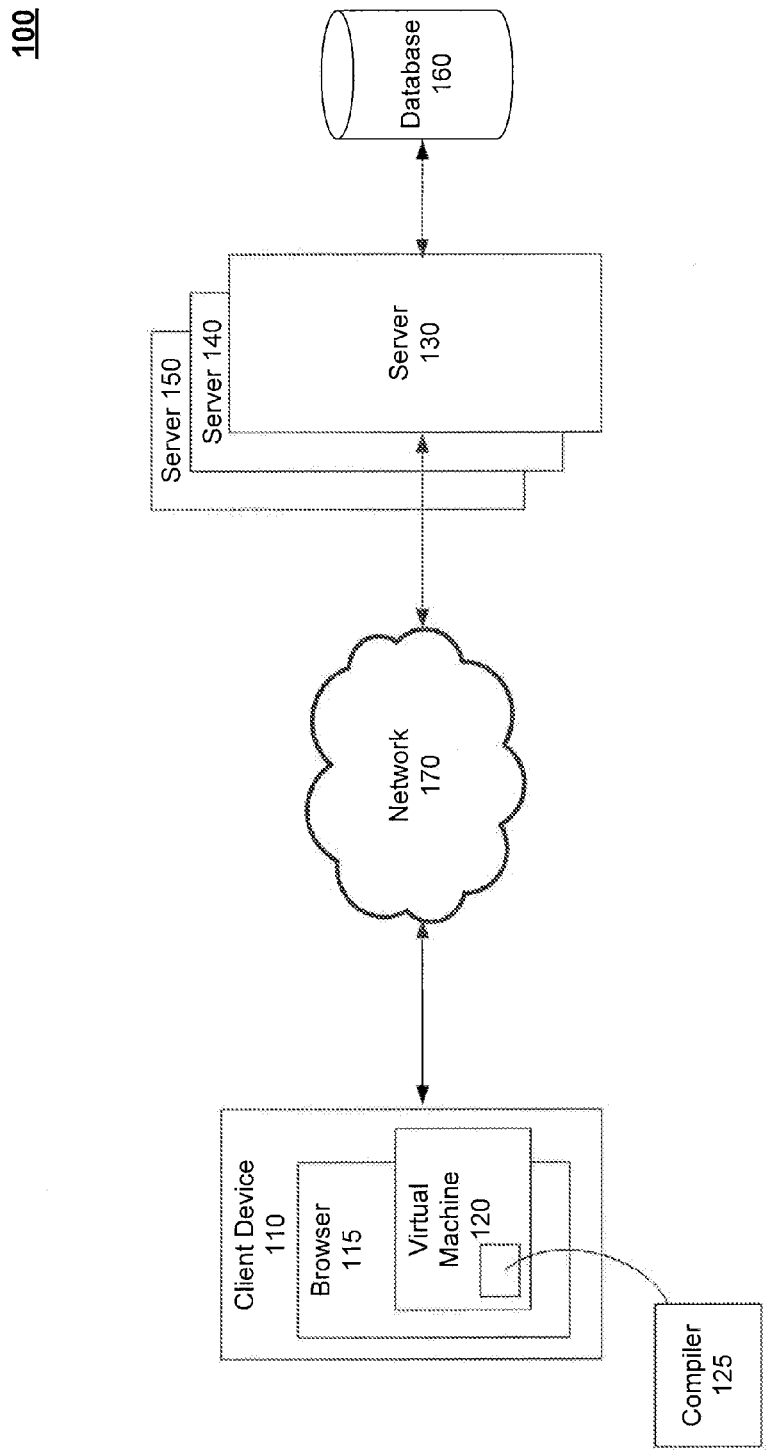
FIG. 1 is a diagram of an exemplary system for optimizing object-oriented programs using limited customization, according to an embodiment.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Introduction

A capability for limited customization that utilizes existing virtual dispatch table technology and allows selective customization is provided. Such a capability combines the usage of virtual dispatch tables with both customized and non-customized code to reduce, or even eliminate over-customization. Further, such a capability may employ a runtime system that decides what methods to customize based on several factors including, but not limited to the size of a class hierarchy, the amount of available space for compiled code, and the amount of available time for compilation.

A common way to implement fast virtual calls in a programming language with static types is by associating a virtual table (or "vtable") with each class. Embodiments enable the customization of whole methods to a receiver class. The entry points to the customized methods are then stored as an entry in the vtable of the receiver class. Accordingly, the correct customized method is called without any type checks at runtime. Further, embodiments enable virtual calls to be inlined as a virtual call in a customized method is inlineable when the customized method has a fixed receiver and the callee method uses the same receiver as the caller.

Customizing code in an object-oriented system means a compiler generates specialized code for each possible type of receiver class when a virtual function, or virtual method of a class object, is invoked within an object-oriented program. A drawback to generating such specialized code for each possible receiver type is customizing too much, referred to herein as "over-customization." As object-oriented programs involve relatively large class hierarchies, over-customization can easily result in code bloat. Thus, embodiments combine the usage of virtual dispatch tables with both customized and on-customized code to reduce, or even eliminate over-customization.

Embodiments may be implemented in a traditional compiler that compiles object-oriented source code prior to runtime or in a just-in-time (JIT) compiler that compiles code dynamically during runtime. An example of such a JIT compiler may be, for example and without limitation, a JIT compiler of a JAVA Virtual Machine (VM) framework. Further, such a JAVA VM may be implemented within a client software application including, but not limited to, a web browser.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "virtual function" and "virtual method" are used interchangeably herein to refer broadly and inclusively to any function or method of a class defined using an object-oriented programming language. The behavior of such a virtual function/method can be overridden by a function defined within another class that inherits from the class corresponding to the virtual function/method. As would be apparent to a person skilled in the relevant art given this description, such a function of the inheriting class has the same signature (e.g., same function name and same number, types, and order of parameters) as the virtual function.

System

FIG. 1 is a diagram of a system 100 suitable for practice of an embodiment. In the example shown in FIG. 1, system 100 includes a client device 110, a browser 115, a virtual machine 120, a compiler 125, servers 130, 140, and 150, a database 160, and a network 170.

Client device 110 communicates with one or more servers 130, for example, across network 170. Although only servers 130, 140, and 150 are shown, fewer or more servers may be used as necessary. Network 170 can be any network or combination of networks that can carry data communication. Such network can include, but is not limited to, a local area network, medium area network, and/or wide area network such as the Internet. Client device 110 can be a general-purpose computer with a processor, local memory, a display, and one or more input devices such as a keyboard or a mouse. Alternatively, client device 110 can be a specialized computing device such as, for example, a mobile handset. Servers 130, 140, and 150 (hereinafter "server(s) 130"), similarly, can be implemented using any general-purpose computer capable of serving data to client device 110.

Client device 110 executes a compiler 125, the operation of which is further described herein. Compiler 125 may be implemented on any type of computing device. Such a computing device can include, but is not limited to, a personal computer, mobile device such as a mobile phone, workstation, embedded system, game console, television, set-top box, or any other computing device. Further, such a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components.

In an embodiment, compiler 125 can be a standalone application, or it can be executed within browser 115. Browser 115 can be any web browsing application, protocol, framework, or service as would be apparent to a person skilled in the art given this description.

For example, compiler 125 may be implemented as a just-in-time (JIT) compiler implemented in a virtual machine 120 embedded within browser 115. Virtual machine 120 can be any type of application virtual machine (VM) implemented in software that executes computer program instructions similar to a physical machine or computer. An example of such a virtual machine includes, but is not limited to, the JAVA virtual machine for the JAVA programming language.

In an example, browser 115 may request information from server(s) 130 over network 170. The request may be, for example, in the form of a HyperText Transfer Protocol (HTTP) request. The information sent by server(s) 130 in response to such request may include one or more program files. The program files may include program instructions or code that can be executed in virtual machine 120. In an embodiment, compiler 125 dynamically compiles such program instructions at runtime. For example, the program instructions may be in the form of JAVA bytecodes executable by virtual machine 120 with the aid of compiler 125.

Server(s) 130 may utilize, for example, database 160 to store program files and any other related information. Database 160 may be any type of data storage known to those of skill in the art. In an example, the data storage may be a database management system, such as a relational database or any other type of database known to those skilled in the relevant art given this description. Database 160 may store any type of data accessible by server(s) 130. Although only database 160 is shown, more databases may be used as necessary.

A person skilled in the relevant art given this description would appreciate that additional information such as, for example and without limitation, configuration information associated with a web application or web service may also be sent by server(s) 130 to client device 110 over network 170 as necessary. Such configuration information may be presented, for example, in a form such as HyperText Markup Language (HTML) and/or Extensible Markup Language (XML). In a further example, the output of the program instructions executed by virtual machine 120 using compiler 125 can be presented on a display coupled to client device 110. The display can be any type of electronic display for viewing text and images or can be any type of rendering device adapted to view such text and image data.

Limited Customization

Figure 2:
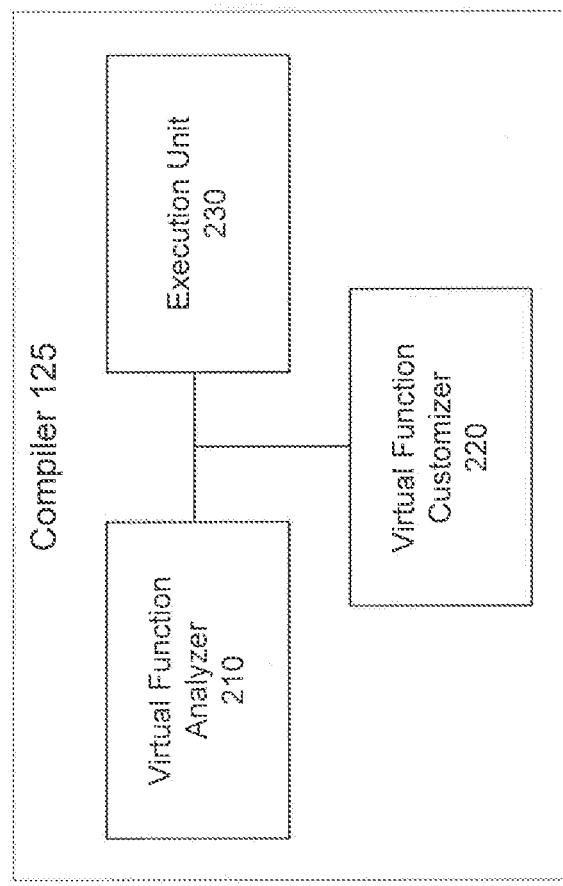
FIG. 2 is a diagram of an exemplary compiler for optimizing object-oriented programs using limited customization, according to an embodiment.

FIG. 2 is a diagram of an exemplary compiler 125 for optimizing object-oriented programs using limited customization, according to an embodiment. Compiler 125 includes a virtual function analyzer 210, a virtual function customizer 220, and an execution unit 230. In an embodiment, virtual function analyzer 210, virtual function customizer 220, and execution unit 230 are communicatively coupled to each other via, for example, an internal data bus of client device 110 of FIG. 1, described above.

In an embodiment, virtual function analyzer 210, virtual function customizer 220, and execution unit 230 can be implemented in software, firmware, hardware, or a combination thereof. Embodiments of virtual function analyzer 210, virtual function customizer 220, and execution unit 230, or portions thereof, can also be implemented as computer-readable code executed on one or more computing devices capable of carrying out the functionality described herein. Such computing devices can include, but are not limited to, a central processing unit, an application-specific integrated circuit, or other type of computing device having at least one processor and memory.

Examples of computing devices in which compiler 125 can be implemented can include, but are not limited to, a mobile phone, a personal digital assistant (PDA), a computer, a cluster of computers, a set-top box, or other similar type of device capable of processing instructions and receiving and transmitting data to and from humans and other computing devices. Although only virtual function analyzer 210, virtual function customizer 220, and execution unit 230 are shown, it would be apparent to a person skilled in the art given the description herein that compiler 125 may include additional components, modules, and/or sub-components as necessary.

As discussed above, compiler 125 can be implemented as a standalone application (e.g., within client device 110 of FIG. 1, described above), according to an embodiment. Also as discussed above, compiler 125 can be implemented as a JIT compiler implemented in a virtual machine (e.g., virtual machine 120 of FIG. 1, as described above), according to a different embodiment. Therefore, it is noted that compiler 125 is discussed with respect to system 100 of FIG. 1 for ease of explanation and for illustrative purposes and embodiments are not intended to be limited thereto.

In an embodiment, virtual function analyzer 210 is operable to receive program files having program instructions or code associated with an object-oriented programming language. Examples of object-oriented programming languages include, but are not limited to, JAVA and C++. For example, the program code or instruction in the program files may contain numerous classes, including one or more hierarchies of different classes. Further, each class hierarchy may contain a "super class," also referred to as a "base class," from which other classes are derived. The super class may contain several functions or methods, including virtual functions. In an embodiment, virtual function analyzer 210 analyzes a program file to determine whether a virtual function in the file is compiled for a receiver class associated with the virtual function. As would be apparent to a person skilled in the relevant art given this description, the receiver class is an instance of a particular class that contains the virtual function's code.

If it is determined that the virtual function is not already compiled for the relevant receiver class, virtual function analyzer 210 may further determine whether the virtual function should be customized, in accordance with an embodiment. For example, virtual function analyzer 210 may make the determination based on a particular performance factor or a combination of such factors. Examples of performance factors virtual function analyzer 210 may use include, but are not limited to, a size of the relevant class hierarchy, an amount of memory space available for compiled code, and/or an amount of time available for compilation. In an example, virtual function analyzer 210 may determine that a particular virtual function should not be customized where the size of the class hierarchy is very large and the amount of available time for compilation is limited. It would be apparent to a person skilled in the relevant art given this description that virtual function analyzer 210 may use any combination or sub-combination of the aforementioned performance factors or any other similar factors to determine whether a virtual function should be customized.

In an embodiment, virtual function customizer 220 is operable to generate a customized version of the virtual function. In this regard, the virtual function is devirtualized by virtual function customizer 220 as the virtual function is compiled for a specific receiver class with an invariant receiver. For example, virtual function customizer 220 can be configured to iterate through one or more instructions of the virtual function. The instructions may be associated with, for example, one or more calls to execute other virtual functions. Further, virtual function customizer 220 can iteratively devirtualize one or all of the virtual calls identified in the virtual function. In an embodiment, virtual function customizer 220 determines whether a virtual call of the virtual function has the same receiver class as the receiver class associated with the virtual function. Virtual function customizer 220 can be configured to identify a target of the virtual call if it is determined that the virtual call has the same receiver as the virtual function. The virtual call can then be devirtualized or compiled by virtual function customizer 220 for the receiver class type if the target can be identified.

In an embodiment, virtual function customizer 220 designates or marks the method or virtual function of the class as customized. For example, virtual function customizer 220 may store the entry point for the customized version of the virtual function as an entry in a virtual table (or simply "vtable") associated with the receiver class. The devirtualization/compilation of the virtual function ensures that the customized version of the virtual function is called at runtime without the need of any type checks. Further, as the customized virtual function/method has a fixed receiver, the virtual function call associated with a customized virtual function can be inlined by compiler 125. For example, as the exact receiver class of the object that is the target of the virtual function call in the virtual function is known, compiler 125 can inline the virtual function call since there is no need to determine the object type at runtime.

In an embodiment, execution unit 230 executes the customized version of the virtual function for an object of the first receiver class based on the stored entry in the virtual table associated with the first receiver class. However, it would be apparent to a person skilled in the relevant art that the execution of the customized virtual function may be performed by another application external to compiler 125 and also executable on client device 110. For example, if compiler 125 is implemented as a JIT compiler in a virtual machine, as described above, the execution of the virtual function and program, with which it is associated, may be performed by another component of the virtual machine.

Method

Figure 3:
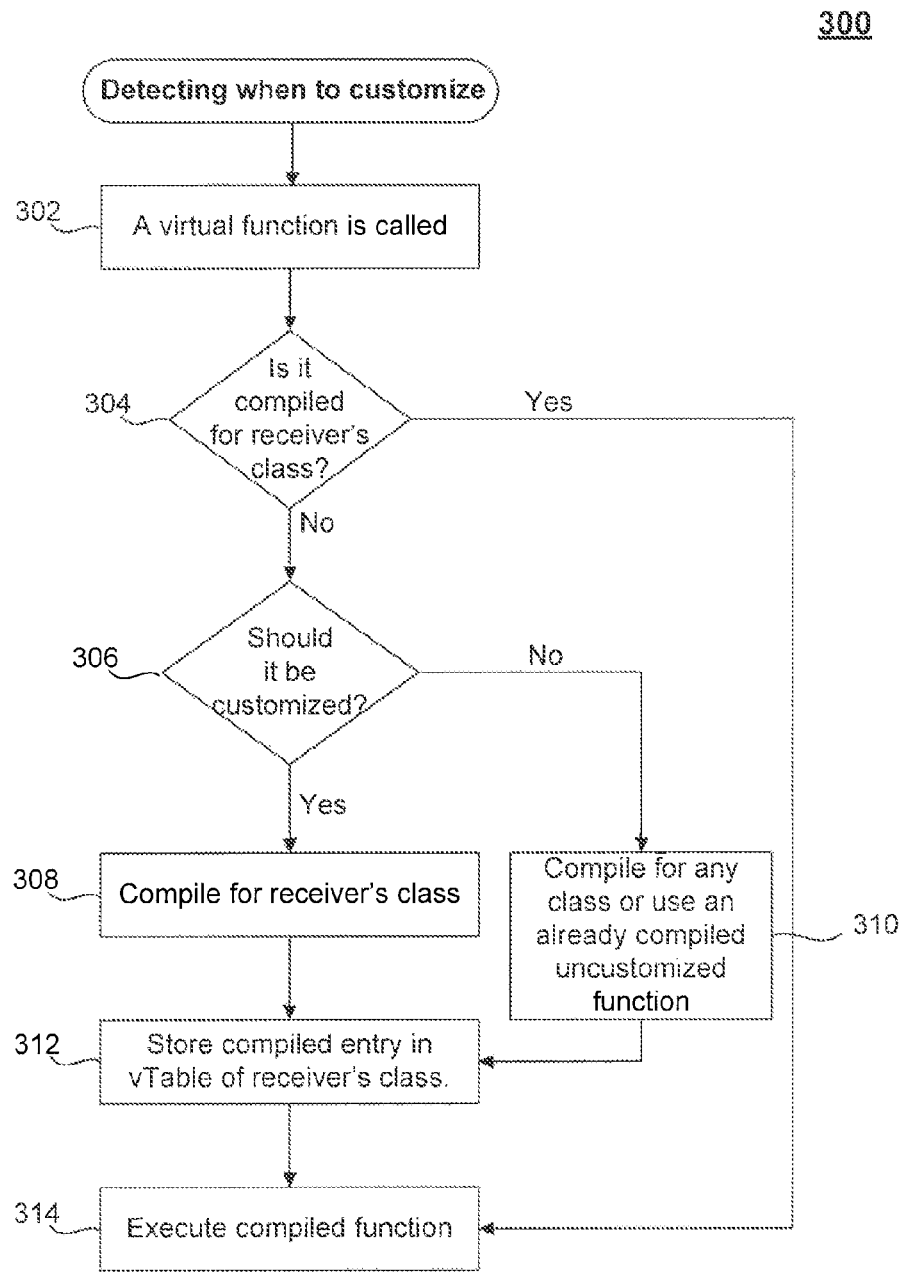
FIG. 3 is a flowchart of an exemplary method for optimizing object-oriented programs using limited customization, according to an embodiment.

FIG. 3 is a flowchart of an exemplary method 300 for optimizing object-oriented programs using limited customization, according to an embodiment. For ease of explanation, system 100 of FIG. 1 and compiler 125, including its components (virtual function analyzer 210, virtual function customizer 220, and execution unit 230) of FIGS. 1 and 2, as described above, will be used to describe method 300, but the method is not intended to be limited thereto.

Method 300 begins in step 302, in which a virtual function call is identified within an object-oriented software program. As described above, for example, the program code or instruction in the program files may contain numerous classes, including one or more hierarchies of different classes. Further, each class hierarchy may contain a "super class," also referred to as a "base class," from which other classes are derived. The super class may contain several functions or methods, including virtual functions.

If a virtual function is called in the program, method 300 proceeds to step 304, in which it is determined whether the virtual function is compiled for a receiver class associated with the virtual function. If it is determined that the virtual method is compiled for the receiver's class, method 300 concludes at step 314, described further below. Alternatively, if it is determined in step 304 that the virtual function is not compiled for the particular receiver's class, method 300 proceeds to step 306, which includes determining whether the virtual function should be customized. For example, the determining in step 306 may be based on a particular performance factor or a combination of such factors. As previously noted, examples of performance factors may include, but are not limited to, size of the relevant class hierarchy, amount of memory space available for compiled code, and/or amount of time available for compilation. Steps 302, 304, and 306 may be performed by, for example, virtual function analyzer 210 of FIG. 2, as described above.

If in step 306, it is determined, e.g., based on one or more of the aforementioned performance factors, that the virtual function should not be customized at this time, method 300 proceeds to step 310, in which the virtual function may be compiled for any relevant class, for example, in the inheritance hierarchy of classes. Alternatively, the virtual function may already be compiled, but not customized for the particular receiver class in question. Thus, step 310 may include using the already compiled uncustomized function. However, if in step 306, it is determined that the virtual function should not be customized, method 300 proceeds to step 308, which includes compiling the virtual function for the particular receiver's class. It is noted that this step may also apply to already compiled uncustomized virtual functions, as described above. Steps 308 and 310 may be performed by, for example, virtual function customizer 220 of FIG. 2, as described above.

Figure 4:
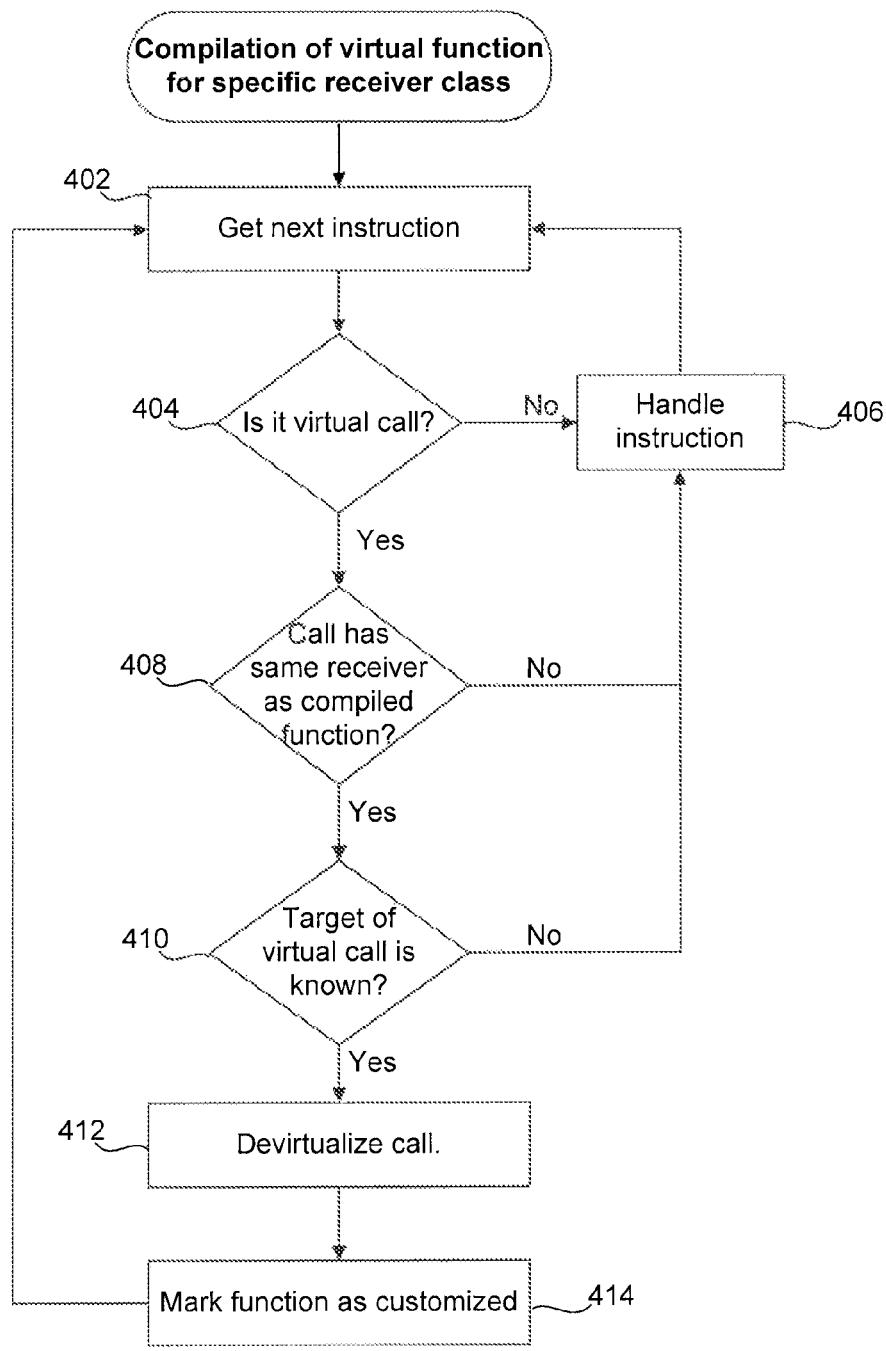
FIG. 4 is a flowchart of an exemplary method for compiling a virtual function for a specific receiver class with an invariant receiver type, according to an embodiment.

FIG. 4 is a flowchart of an exemplary method 400 for compiling a virtual function for a specific receiver class with an invariant receiver type, according to an embodiment. Like method 300, for ease of explanation, method 400 will be described with respect to system 100 of FIG. 1 and compiler 125 of FIGS. 1 and 2, as described above, but method 400 is not intended to be limited thereto. The steps of method 400 may be performed by, for example, virtual function customizer 220 of FIG. 2, as described above.

Method 400 begins in step 402, which includes receiving and processing an instruction within the virtual function. For example, the instruction may correspond to a declaration and/or initialization of a data variable or a call to execute a function. In step 404, it is determined whether this instruction corresponds to a call to a virtual function. If the instruction is not a virtual function call, method 400 can proceed to step 406, in which the instruction is handled appropriately, and then return to step 402, to process the next available instruction. It is noted that method 400 may also conclude in step 406 if all the instructions of the virtual function have been received and processed. However, if the instruction is a virtual function call, then method 400 can proceed to step 408, which includes determining whether the virtual function call has the same receiver class as the instant virtual function being compiled (or already compiled uncustomized virtual function, as described above).

If the call does not have the same receiver as the virtual function, method 400 proceeds to step 406, as described above. Otherwise, method 400 proceeds to step 410, in which it is further determined whether the target of the virtual call is known or can be identified. As in step 408, method 400 returns to step 406, followed by step 402, in case the target of the virtual call is not known or cannot be identified. However, if the target of the virtual call can be identified, method 400 proceeds to step 412, in which the virtual call is devirtualized. The call is devirtualized by being compiled for the specific receiver class of the instant virtual function corresponding to the received instructions (step 402) that is currently be compiled or recompiled (e.g., for purposes of customization).

Once the call is devirtualized, method 400 concludes in step 414, which includes denoting or marking the virtual function as being customized. Step 414 may include, for example, storing the entry point of the customized version of the virtual function as an entry in a virtual table (or simply "vtable") associated with the receiver class, as described above. However, it is noted that step 414 may be an optional step. Referring back to FIG. 3, once the virtual function has been compiled (or customized) for the receiver's class, as described above, method 300 can proceed to step 312, which includes storing the entry point of the customized version of the virtual function as an entry in the vtable associated with the receiver class. In this regard, step 312 may be performed if step 414 of method 400 has not been performed. Alternatively, step 312 may be excluded if the vtable entry has already been stored in step 414 of method 400. Step 312 may be performed by, for example, virtual function customizer 220 of FIG. 2, as described above.

Method 300 concludes in step 314, in which the customized virtual function, compiled to the relevant receiver class, is executed. It is noted that step 314 may also be an optional step, in accordance with an embodiment. For example, method 300 may be performed by compiler 125, implemented as either a standalone application (e.g., a C++ compiler that compiles code statically) or a JIT compiler in a virtual machine (e.g., a JAVA compiler that compiles code dynamically at runtime), as described above. Thus, for example, step 314 may be limited to only the latter embodiment of compiler 125, as a JIT compiler for dynamic compilation and execution of code. Step 314 may be performed by, for example, execution unit 230 of FIG. 2, as described above. As previously noted, it would be apparent to a person skilled in the relevant art that the above-described example is only provided for illustrative purposes and embodiments are not limited thereto. For example, execution of the customized virtual function (e.g., compiled by compiler 125 of FIG. 1)

may be performed by another application executing on a client device (e.g., client device 110 of FIG. 1).

An advantage of embodiments of methods 300 and 400 as described herein is that such embodiments ensure that a customized version of a virtual function can be called at runtime without the need of any type checks. Further, as the customized virtual function has a fixed receiver (step 308 of method 300), the virtual function call associated with a customized virtual function may be inlined by a compiler (e.g., compiler 125 of FIG. 1, as described above). As the exact receiver class of the object that is the target of the virtual function call in the virtual function is known (steps 410 and 412 of method 400), there is no need to determine the object type at runtime. Thus, the compiler is enabled to perform code optimizations, such as inlining the virtual function call.

The customization example below further illustrates how methods 300 and 400 of FIGS. 3 and 4, respectively, can be used to customize virtual functions.

Customization Example

Figure 5:
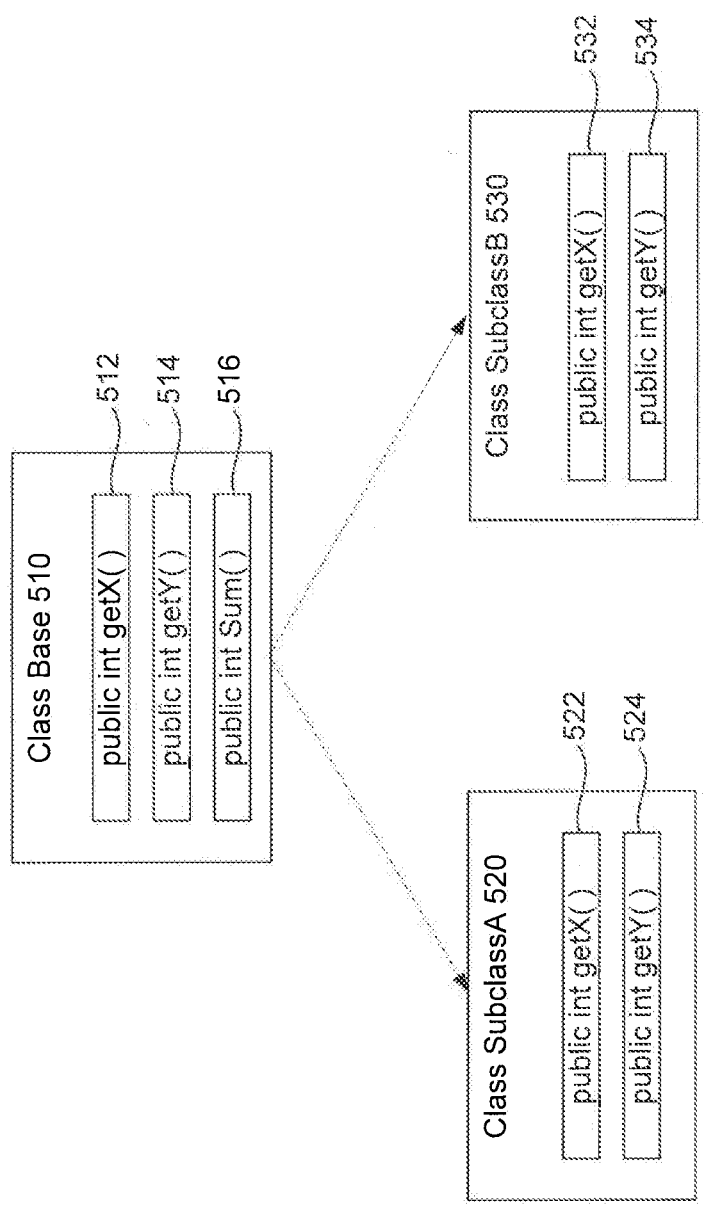
FIG. 5 illustrates example subclasses derived from a base class, which has virtual functions that can be customized, according to an embodiment.

FIG. 5 illustrates example subclasses 520 and 530 derived from a base class 510, which has virtual functions 512 and 514 that can be customized, according to an embodiment. As described above and as will be further described in the example below, customization of virtual functions by devirtualizing calls to virtual functions can greatly help to improve the performance of generated code at runtime.

In this example, the following high-level software code based on the JAVA programming language will be used for base class 510:

```
class Base {
    public int getX( ) {return 1;}
    public int getY( ) {return 2;}
    public int Sum( ) {return getX( )+getY( );}
}
```

Further, subclasses 520 and 530 will correspond to SubclassA and SubclassB, respectively, as shown in the following example code:

```
class SubclassA extends Base {
    public int getX( ){return 1;}
    public int getY( ){return 2;}
}
class SubclassB extends Base {
    public int getX( ) {return 100;}
    public int getY( ) {return 200;}
}
```

The following code shows an example of how the above classes may be used in a main routine:

```
// Main code.
SubclassA A=new SubclassA( );
SubclassB B=new SubclassB( );
int k=A.Sum( );
int j=B.Sum( );
```

In the example illustrated in FIG. 5 and the corresponding example code above, subclasses 520 and 530 both inherit from base class 510. Accordingly, virtual function 512 of base class 510 is overridden by functions 522 and 532 in subclasses 520 and 530, respectively. Similarly, virtual function 514 of base class 510 is overridden by functions 524 and 534 of subclasses 520 and 530, respectively. As shown in the code above corresponding to base class 510, function 516 of base class 510 calls the two virtual functions (514 and 516) that are overridden in subclasses 520 and 530.

Referring back to FIGS. 3 and 4, methods 300 and 400, as described above, can be used to customize function 516 to receiver types corresponding to base class 510 (type "Base"), subclass 520 (type "SubclassA"), and subclass 530 (type "SubclassB"). Creating customized versions of function 516 ("Sum") for each receiver type (e.g., type SubclassA and type SubclassB) devirtualizes calls to virtual function 512 ("getX") and virtual function 514 ("getY"). For example, when the lines of code "int k=A.Sum ( );" and "int j=B.Sum( );" of the main routine are executed, the virtual function table, or vtable, for base class 510 can be used to invoke the correct customized compiled function of "Sum." Accordingly, the vtable of base class 510 may include two entries for each of virtual function 512 and virtual function 514 where each entry corresponds to a specific receiver class or receiver type (i.e., "SubclassA" or "SubclassB"). Thus, if the lines of main code provided above were to be executed, the resulting value of 'k' would be equivalent to "3" and the resulting value of 'j' would be equivalent to "300."

It would be apparent to a person skilled in the relevant art given this description that the code corresponding to the base class and subclasses used in this example are provided for illustrative purposes only, and embodiments are not limited thereto. Similarly, the JAVA programming language is provided only as an example of an object-oriented programming language, and embodiments are not limited thereto.

Example Computer System Implementation

Embodiments shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
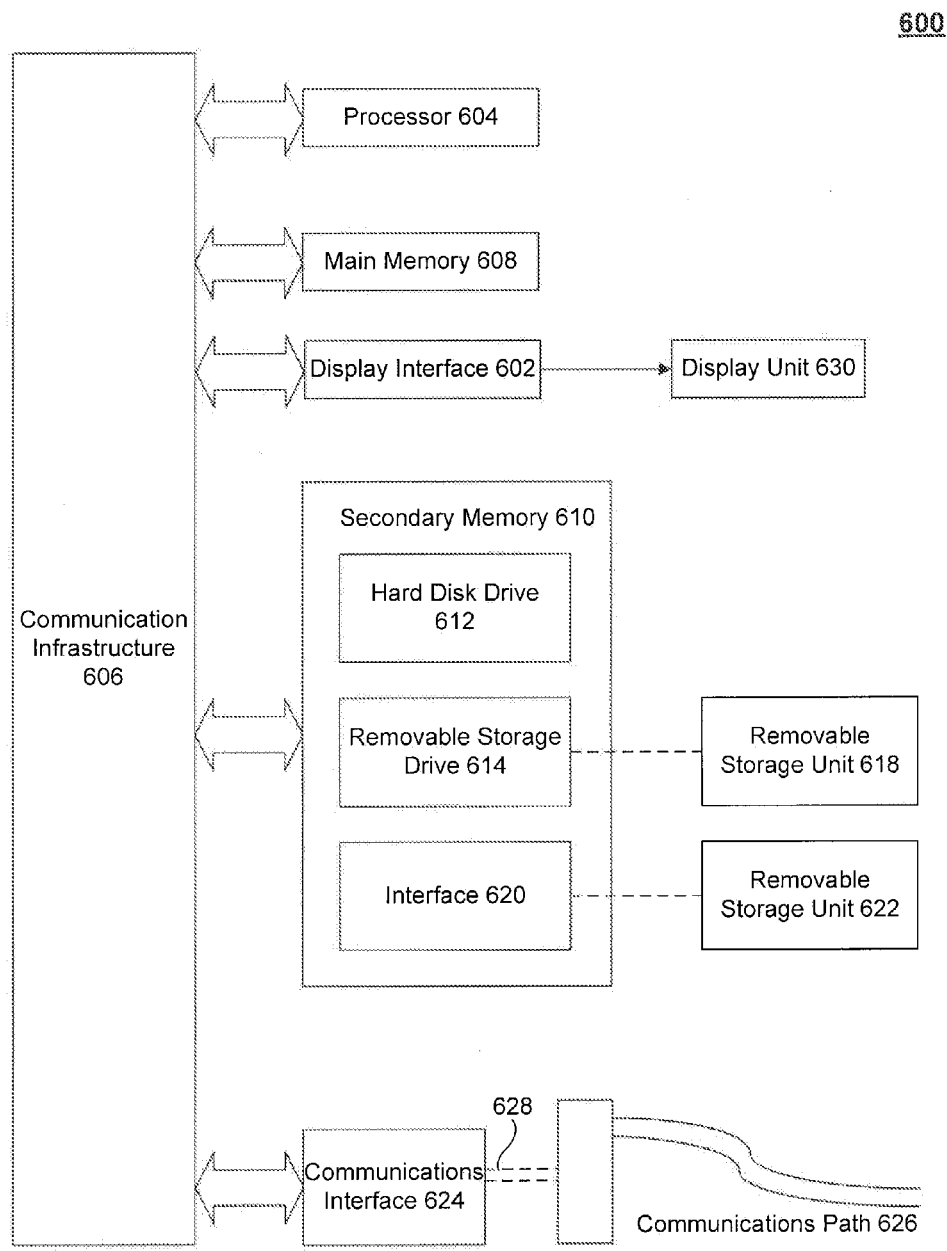
FIG. 6 is a diagram of an example computer system in which embodiments can be implemented.

FIG. 6 illustrates an example computer system 600 in which embodiments, or portions thereof, may be implemented as computer-readable code. For example, client device 110 of FIG. 1 can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-2.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement embodiments as discussed herein. In particular, the computer programs, when executed, enable processor device 604 to implement the processes of embodiments of the present invention, such as the stages in the methods illustrated by flowcharts 300 and 400 of FIGS. 3 and 4, respectively, discussed above. Accordingly, such computer programs represent controllers of the computer system 600. Where embodiments are implemented using software, the software may be stored in a computer program product and loaded into computer system 600 using removable storage drive 614, interface 620, and hard disk drive 612, or communications interface 624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for optimizing object oriented programs using limited customization comprising:
   determining whether a virtual function is compiled for a first receiver class associated with the virtual function;
   if it is determined that the virtual function is not already compiled for the first receiver class, determining whether to customize the virtual function having the associated first receiver class;
   generating, if it is determined to customize the virtual function, a customized version of the virtual function having one or more devirtualized function calls of the virtual function;

storing an entry for the customized version of the virtual function in a virtual table associated with the first receiver class, wherein the virtual table stores an entry point of the virtual function that is not customized; and executing the customized version of the virtual function for an object of the first receiver class based on the stored entry in the virtual table associated with the first receiver class, wherein the determining, the generating, the storing, and the executing are performed using one or more computing devices.

2. The method of claim 1, wherein the generating, the storing, and the executing are performed dynamically during runtime.

3. The method of claim 1, wherein the determining, the generating, the storing, and the executing are performed statically prior to runtime.

4. The method of claim 1, wherein the determining further comprises:

determining whether the virtual function is customized based on a size of class hierarchy associated with the virtual function.

5. The method of claim 4, wherein the determining further comprises determining whether the virtual function is customized based on an amount of available memory space for compiled code.

6. The method of claim 5, wherein the determining further comprises determining whether the virtual function is customized based on an amount of available time for compilation.

7. The method of claim 6, wherein the generating further comprises:

customizing the virtual function to a first receiver type corresponding to the first receiver class based on the determining.

8. The method of claim 7, wherein the customizing the virtual function to the first receiver type comprises:

determining whether a first virtual call in the one or more virtual calls of the virtual function has a same receiver class as the first receiver class associated with the virtual function;

identifying a first target of the first virtual call based on the determining for the first virtual call; and devirtualizing the first virtual call for the first receiver type based on the identifying.

9. The method of claim 8, further comprising:

customizing the virtual function to a second receiver type corresponding to a second receiver class associated with the virtual function based on the determining whether to customize the virtual function.

10. The method of claim 9, wherein the customizing the virtual function to the second receiver type comprises:

determining whether a second virtual call in the one or more virtual calls of the virtual function has the same receiver class as the second receiver class associated with the virtual function;

identifying a second target of the second virtual call based on the determining for the second virtual call; and devirtualizing the second virtual call for the second receiver type based on the identifying of the second target.

11. A system for optimizing object oriented programs using limited customization comprising:

at least one processor;

a virtual function analyzer configured to determine whether a virtual function is compiled for a first receiver class associated with the virtual function and determine whether to customize the virtual function having the associated first receiver class, if it is determined that the virtual function is not already compiled for the first receiver class;

a virtual function customizer configured to:

generate, based on the determination of the virtual function analyzer that it is determined to customize the virtual function, a customized version of the virtual function having one or more devirtualized function calls of the virtual function, compile the virtual function for the first receiver class, and store an entry for the customized version of the virtual function in a virtual table associated with the first receiver class, wherein the virtual table stores an entry point of the virtual function that is not customized; and an execution unit configured to execute on the at least one processor the customized version of the virtual function for an object of the first receiver class based on the stored entry in the virtual table associated with the first receiver class.

12. The system of claim 11, wherein the virtual function analyzer, the virtual function customizer, and the execution unit perform operations dynamically during runtime.

13. The system of claim 11, wherein the virtual function analyzer, the virtual function customizer, and the execution unit perform operations statically prior to runtime.

14. The system of claim 11, wherein the virtual function analyzer is further configured to determine whether the virtual function is customized based on a size of class hierarchy associated with the virtual function.

15. The system of claim 14, wherein the virtual function analyzer is further configured to determine whether the virtual function is customized based on an amount of available memory space for compiled code.

16. The system of claim 15, wherein the virtual function analyzer is further configured to determine whether the virtual function is customized based on an amount of available time for compilation.

17. The system of claim 16, wherein the virtual function customizer is further configured to customize the virtual function to a first receiver type corresponding to the first receiver class based on the determination of the virtual function analyzer.

18. The system of claim 17, wherein the virtual function customizer is configured to determine whether a first virtual call in the one or more virtual calls of the virtual function has a same receiver class as the first receiver class associated with the virtual function, to identify a first target of the first virtual call based on the determination, and to devirtualize the first virtual call for the first receiver type based on the identification.

19. The system of claim 18, wherein the virtual function customizer is further configured to customize the virtual function to a second receiver type corresponding to a second receiver class associated with the virtual function based on the determining.

20. The system of claim 19, wherein the virtual function customizer is further configured to determine whether a second virtual call in the one or more virtual calls of the virtual function has the same receiver class as the second receiver class associated with the virtual function, to identify a second target of the second virtual call based on the determination for the second virtual call, and to devirtualize the second virtual call for the second receiver type based on the identification of the second target.

21. A non-transitory computer readable storage device having instructions stored thereon that, when executed by a computing device, cause the computing device to perform operations comprising:
- determining whether a virtual function is compiled for a first receiver class associated with the virtual function;
- if it is determined that the virtual function is not already compiled for the first receiver class, determining whether to customize the virtual function having the associated first receiver class;
- generating, if it is determined to customize the virtual function, a customized version of the virtual function having one or more devirtualized function of the virtual function;
- storing an entry for the customized version of the virtual function in a virtual table associated with the first receiver class, wherein the virtual table stores an entry point of the virtual function that is not customized; and
- executing the customized version of the virtual function for an object of the first receiver class based on the stored entry in the virtual table associated with the first receiver class,
- wherein the determining, the generating, the storing, and the executing are performed using one or more computing devices.

* * * * *